No. 646,141. Patented Mar. 27, 1900.
W. CORLISS.
PNEUMATIC WHEEL TIRE.
(Application filed July 28, 1899.)
(No Model.) 2 Sheets—Sheet 1.
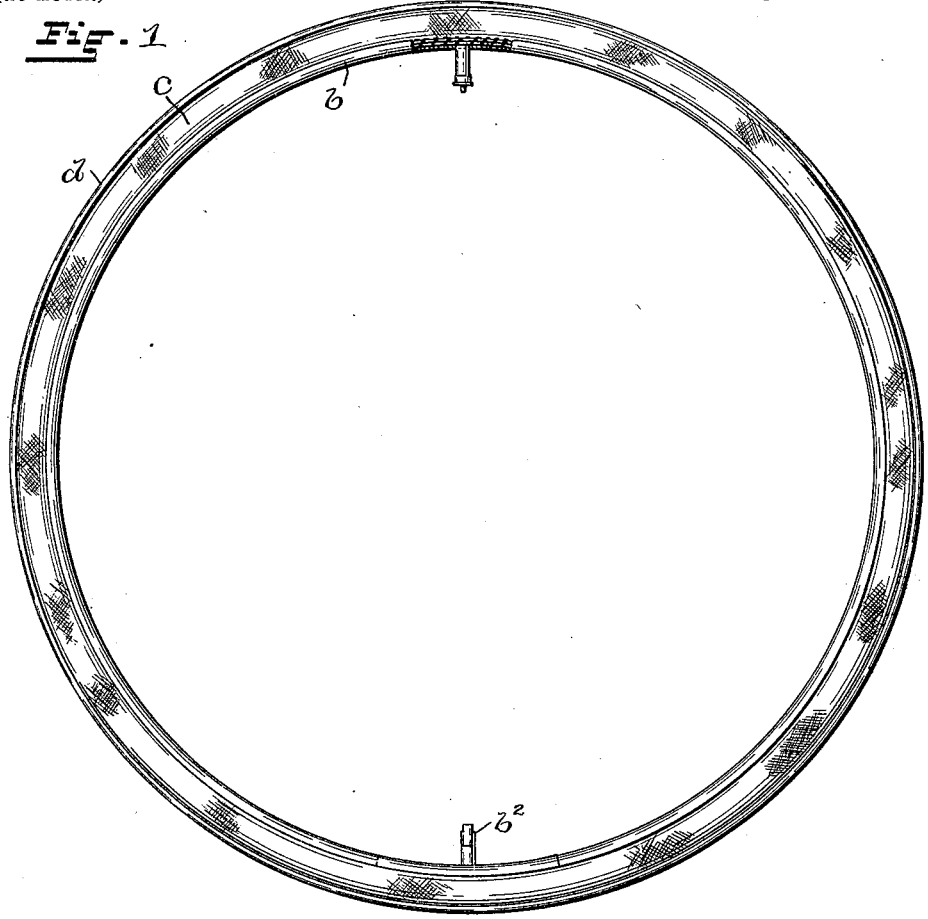
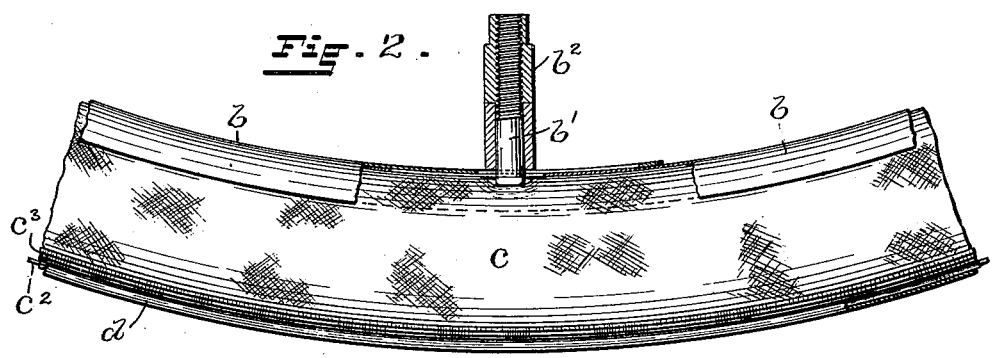
WITNESSES: INVENTOR:
Chas. H. Luther Jr William Corliss
B. M. Simms by Joseph A. Miller & Co.
Attys.
THE NORRIS PETERS CO., PHOTO-LITHO., WASHINGTON, D. C.

No. 646,141. Patented Mar. 27, 1900.
W. CORLISS.
PNEUMATIC WHEEL TIRE.
(Application filed July 28, 1899.)
(No Model.) 2 Sheets—Sheet 2.
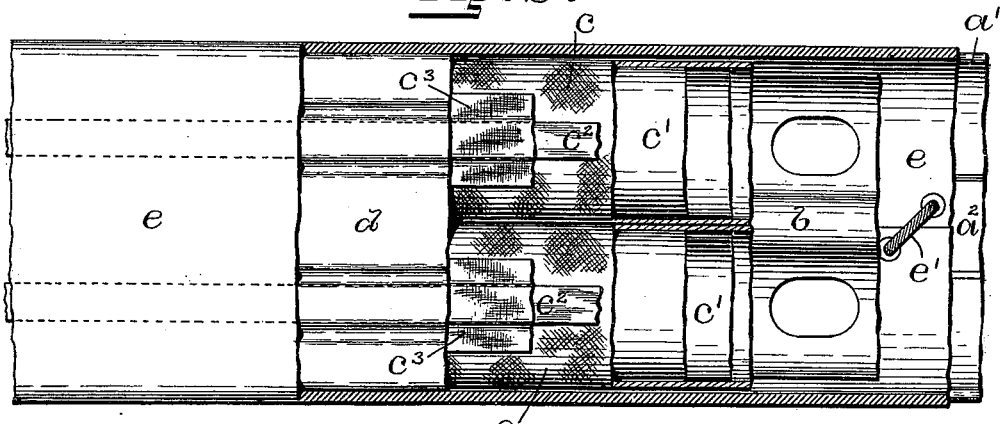
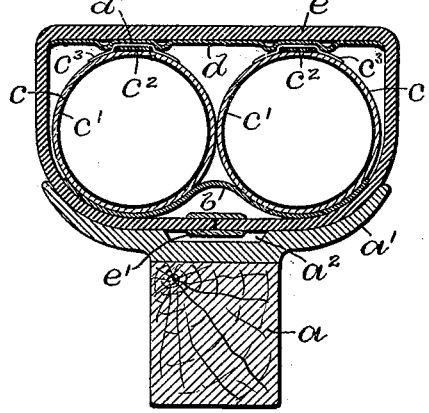
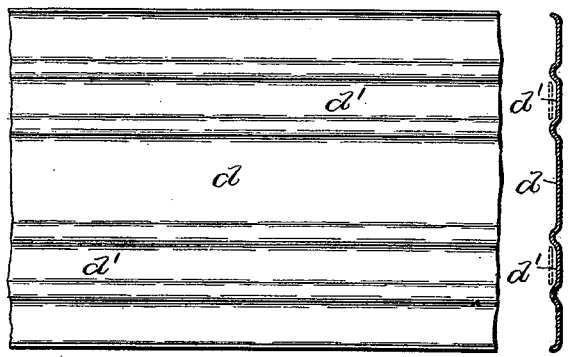
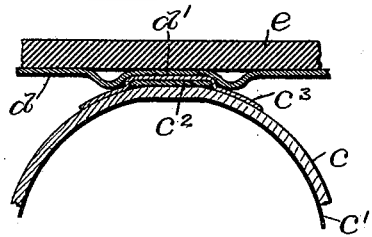
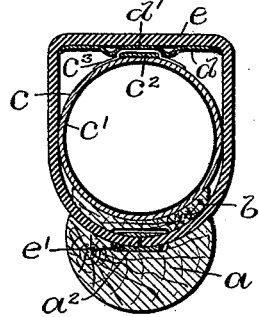
WITNESSES:
Chas. H. Luther Jr
B. M. Simms
INVENTOR:
William Corliss
by Joseph A. Miller & Co.
Attys.
THE NORRIS PETERS CO., PHOTO-LITHO., WASHINGTON, D. C.

UNITED STATES PATENT OFFICE.

WILLIAM CORLISS, OF PROVIDENCE, RHODE ISLAND.

PNEUMATIC WHEEL-TIRE.

SPECIFICATION forming part of Letters Patent No. 646,141, dated March 27, 1900.

Application filed July 28, 1899. Serial No. 725,387. (No model.)

*To all whom it may concern:*

Be it known that I, WILLIAM CORLISS, of Providence, in the county of Providence and State of Rhode Island, have invented a new and useful Improvement in Pneumatic Wheel-Tires; and I hereby declare that the following is a full, clear, and exact description of the same, reference being had to the accompanying drawings, forming part of this specification.

This invention has reference to an improvement in the class of wheel-tires in which an air-cushion is interposed between the tread of the tire and the rim of the wheel.

The invention consists in the peculiar and novel construction and the combination of parts whereby the annular air cushions or tubes are free to yield to the load and free to exert the resiliency of the air-pressure while they are securely held in the plane of the wheel, as will be more fully set forth hereinafter.

The easy riding of a vehicle provided with pneumatic tires is due to the mobility of the air contained in the air-cushion. The ideal tire would be a thin flexible non-elastic tube secured to the rim of the wheel and filled with air under sufficient pressure to support the load and readily yield to shocks and inequalities on the road-bed. Such an air-tube would be too frail for practical use and would become useless when punctured. If the air-tube is made of heavier material, its wearing capacity is increased, while under the same air-pressure its resiliency or life is diminished.

A metal tube filled with air under pressure would be durable and puncture-proof; but it would not yield quickly to blows or inequalities on the road-bed, neither would it resume its original form. Therefore as we depart from a flexible non-elastic fabric air-tube able to resist the internal pressure and approach, by strengthening the walls of the tube, the conditions of a metal tube we sacrifice the life, resiliency, and easy-riding cushion of the textile tube and increase the sluggish action of the tire.

For practical work the fabric tube must be protected against puncture by a shield or armor, which to secure the best result should be free to yield to the load and yield independent of the fabric tube or the cover, if used. An annular ring of a width sufficient to protect the fabric tube will form a sufficient protection without interfering with the resilient action of the flexible tube under air-pressure.

To secure the best result, the annular ring should extend in a practically-straight line transversely across the fabric tube; but in use, particularly in turning curves, this annular ring, or, as I term it, the "tread-band," is liable to move sidewise on the fabric tube and expose part of the tube to puncture.

If the air-tube were secured to the tread-band, the free resilient action of the air-tube would be limited by the tread-band, and if the air-tube were placed into a casing extending along the sides of the air-tube the free lateral movement of the air-tube would be limited by the casing. To secure the best cushioning action, I find in practice that the air-tube under the internal air-pressure must in the normal condition maintain the circular form of cross-section; second, that the walls of the air-tube must consist of a very flexible non-expansible fabric having none of the semi-rigid qualities of the heretofore-used tire, the walls of which have been stiffened by fabric impregnated with rubber cement usually vulcanized to impart solidity and wearing capacity, and, thirdly, that the so-constructed flexible air-tube must be disconnected and free to exert its resiliency and resume its normal form of circular cross-section the instant the local compression is removed.

The object of this invention is to secure a wheel-tire in which the load is supported on one or more flexible non-elastic fabric tubes protected by an armor ring or tread-band, which while free to yield with or independent of the fabric tube or tubes is held in the plane of the fabric tube or tubes against independent lateral movement.

Figure 1 is a side view, partly in section, of my improved tire. Fig. 2 is a side view, partly in section, of part of the tire on an enlarged scale. Fig. 3 is a top view of a wheel-tire, in which parts are shown as cut away, so as to present successively the parts forming the tire on a large scale. Fig. 4 is a transverse sectional view of the wheel-tire shown in Fig. 3. Fig. 5 is a top view, and Fig. 6 a sectional view, of the annular ring or tread-band. Fig. 7 is a sectional view of parts of the tire, showing the connection between the fabric tube and the tread-band by which independent lateral movement is prevented. Fig. 8 is a transverse sectional view of a single-tube tire adapted for use on a bicycle embodying my invention.

Similar marks of reference indicate corresponding parts in all the figures.

In the drawings, $a$ indicates the wheel-rim, which in bicycle and similar wheels is usually provided with a concaved seat for the tire. In carriage and similar wheels I provide the rim with the annular ring $a'$, projecting outward from the fellies or rim on opposite sides to form the support of two or more air-inflated tubes and provide the same with the groove $a^2$; $b$, a bolster curved to form a seat for one or more of the air-inflated tubes. This bolster extends around the rim, is slotted at the opposite overlapping ends, and is secured in the adjusted position by the T-bolt $b'$, the screw-threaded end of which is in engagement with the internally-screw-threaded sleeve-nut $b^2$. The transverse section of the bolster corresponds with the tire-seat on the rim or the annular ring $a'$, so that the cover of the tire may be firmly clamped between the bolster and the rim.

The tube $c$ or tubes $c$ $c$ are fabric tubes formed of strong yarn, preferably of single thickness. These tubes are made as flexible as possible and strong enough to resist the internal air-pressure. They are preferably not impregnated with rubber or any other material, but have inserted into them the usual thin elastic air-tubes $c'$, which expand and, lying closely against the inner surface of the fabric tubes, are supported by the same, so as to resist the internal air-pressure. The narrow metal strip $c^2$ is formed into an annular hoop by riveting or otherwise securing the ends together and is secured to the fabric tube $c$ by the strip $c^3$ of flexible material, cemented to the outer surface of the fabric tube $c$ on each side of the strip $c^2$, or in any other suitable manner.

The tread-band $d$, preferably made of spring-steel and formed into a hoop or ring by uniting the ends, is a practically-flat hoop of a width sufficient to extend transversely over the whole width of the fabric tube or tubes, forming the elastic support of the tire. A shallow groove $d'$ is formed in the tread-band $d$ for the reception of the strip $c^2$, and the edges of the tread-band $d$ are preferably somewhat rounded.

The cover $e$, made of any suitable, preferably non-elastic, material, is secured together by the lacing $e'$. The cover incloses the bolster-ring $b$, the fabric tube or tubes $c$, and the tread-band $d$, which forms the tire proper, and is firmly clamped between the bolster-ring and the annular ring $a'$, or the wheel-rim $a$ when only one tube $c$ is used. The cover $e$ bears on the flat surface of the tread-band and forms a flat tread, giving a broad bearing-surface to the wheel, preferably but little raised or crowned in the center, forming a firm support, and preventing the raising or throwing of mud.

The operation of the tire when used on a loaded vehicle provided with the sheet-steel tread-band protects the tube or tubes $c$ against puncturing, cutting, and wear. The fabric tube or tubes $c$, expanded by the internal air-pressure into their normal cylindrical form, are the sole support of the vehicle. The tube or tubes $c$ are maintained in their true plane by the tongue-and-groove connection between the tube and the tread-band without in the slightest affecting their flexibility, resiliency, or cushioning action. The weight carried by the wheel and inequalities in the road-surface act on the cover and the tread-band. In yielding to the pressure the cover between the tread-band and the bolster expands outward, and thus allows the fabric tubes to yield freely without the slightest resistance from the cover and with the minimum resistance from the walls of the fabric tubes, which are restored instantly to their normal cylindrical form as soon as the pressure is released. The internal air-pressure in the fabric tubes and the narrow metal strip in the groove of the tread-band prevent the lateral creeping of the tubes or the tread-band, maintaining them always in their relative positions.

I do not wish to confine myself to the exact means shown and described herein for connecting the fabric tubes with the tread-band, as these may be varied without materially altering the beneficial result secured by so connecting a non-elastic fabric tube with a tread-band without securing the same to each other or to the cover, which, as far as I am aware, I was the first to do.

Having thus described my invention, I claim as new and desire to secure by Letters Patent—

1. In a wheel-tire, in combination, a bolster-ring, forming the seat of the inflated non-elastic flexible fabric air tube or tubes, curved to correspond with a section or sections of the inflated non-elastic air tube or tubes, the non-elastic fabric air tube or tubes, a metal tread-band extending transversely across the width of the air tube or tubes, and means, whereby the tube or tubes, while being held against lateral movement on the tread-band, are free to move longitudinally on the same, as described.

2. In a wheel-tire, in combination, a bolster-ring transversely curved to form the seat or seats for the inflated non-elastic air-tube and conforming to the section of the inflated air tube or tubes, means for securing the ends of the bolster-ring, one or more non-expansible fabric air-tubes, a metal tread-band extending transversely across the whole width of the tube or tubes, and means, substantially as described, whereby the tube or tubes are restrained against lateral movement on the tread-band, as described.

3. In a wheel-tire, the combination with the flexible non-elastic air tube or tubes and a sheet-metal tread-band extending transversely across the whole width of the air tube or tubes, of a recess in the tread-band, and a projection on the tube or tubes; whereby the relations between the tube and the tread-band are maintained, as described.

4. In a wheel-tire, in combination, a rim having a concave seat for the tire, a non-expansible fabric air-tube, a metal tread-band extending transversely over the width of the fabric air-tube, a flexible cover, a concavo-convex bolster-ring, and means, substantially as described, for securing the ends of the bolster; whereby the cover is clamped between the concave surface of the rim and the convex surface of the bolster, and the fabric air-tube is protected against puncturing without restricting the resilient action of the tube, as described.

5. In a wheel-tire, in combination, a rim, a concave seat in the rim, a non-expansible flexible fabric tube, an elastic air-tube, a concavo-convex bolster-ring, means for securing the ends of the bolster-ring, a tread-band extending transversely across the whole width of the fabric tube, an interlocking device by which the fabric tube, while free to yield independent of the tread-band, is held against lateral movement on the tread-band, and a cover extending over the tread-band and inclosing the fabric tube and bolster, as described.

6. In a pneumatic wheel-tire, in combination, a non-elastic fabric tube, a ring, formed of a strip of steel the ends of which are secured together, secured to the fabric tube, a tread-band the ends of which are secured together to form a ring, and a recess in the tread-band for the reception of the ring on the fabric tube; whereby the tube and tread-band are held against independent lateral movement, as described.

In witness whereof I have hereunto set my hand.

WILLIAM CORLISS.

Witnesses:
J. A. MILLER, Jr.,
B. M. SIMMS.